(12) United States Patent
Naka et al.

(10) Patent No.: US 8,466,860 B2
(45) Date of Patent: Jun. 18, 2013

(54) TRANSFLECTIVE TYPE LCD DEVICE HAVING EXCELLENT IMAGE QUALITY

(75) Inventors: Kenichirou Naka, Kanagawa (JP); Michiaki Sakamoto, Kanagawa (JP); Kenichi Mori, Kanagawa (JP); Hiroshi Nagai, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 863 days.

(21) Appl. No.: 11/971,549

(22) Filed: Jan. 9, 2008

(65) Prior Publication Data

US 2009/0009447 A1 Jan. 8, 2009

(30) Foreign Application Priority Data

Jan. 10, 2007 (JP) ................................. 2007-002854

(51) Int. Cl.
    *G09G 3/36* (2006.01)
(52) U.S. Cl.
    USPC ................................. 345/87; 345/204; 345/50
(58) Field of Classification Search
    USPC ................. 345/204–206, 690, 50–55, 60, 63, 345/76–79, 87–111
    See application file for complete search history.

(56) References Cited

U.S. PATENT DOCUMENTS

| | | | |
|---|---|---|---|
| 6,600,470 B1 * | 7/2003 | Tsuda | 345/89 |
| 7,777,840 B2 * | 8/2010 | Enomoto et al. | 349/114 |
| 2003/0052869 A1 * | 3/2003 | Fujii et al. | 345/204 |
| 2005/0140897 A1 * | 6/2005 | Kim | 349/141 |
| 2007/0236640 A1 * | 10/2007 | Kimura | 349/141 |

FOREIGN PATENT DOCUMENTS

| | | |
|---|---|---|
| JP | 2000193936 A | 7/2000 |
| JP | 2003157052 A | 5/2003 |
| JP | 2003-344837 A | 12/2003 |
| JP | 2004117749 A | 4/2004 |
| JP | 2004157288 A | 6/2004 |
| JP | 2004226947 A | 8/2004 |
| JP | 2005189570 A | 7/2005 |
| JP | 2005538421 A | 12/2005 |
| JP | 2006-180200 A | 7/2006 |
| TW | 200609574 A | 3/2006 |

OTHER PUBLICATIONS

Jeong, et al., "A Single Gap Transflective Fringe-Field Switching Display", SID2006 Digest P-159, 2006, pp. 810-12, SID.
Japanese Office Action dated Dec. 20, 2011 for corresponding Japanese Application No. 2007-002854.
Communication from Taiwanese Patent Office dated Sep. 11, 2012 in corresponding Taiwanese Patent Application No. 097100959.

* cited by examiner

*Primary Examiner* — Christopher E Leiby
(74) *Attorney, Agent, or Firm* — Sughrue Mion, PLLC

(57) ABSTRACT

An LCD device has a reflective area that reflects light incident from a polarizing film side using a reflection film, and a transmissive area that transmits light of a backlight incident from a TFT substrate side. The drive voltages of the reflective area and transmissive area are Vr and Vt, the black voltage in the reflective area is Vr(K), the black voltage in the transmissive area is Vt(K). The reflectance R, the transmittance T, characteristics of R with respect to drive voltage [Vr(K)–Vr] and characteristics of T with respect to drive voltage [Vt–Vt(K)] substantially match each other.

9 Claims, 12 Drawing Sheets

TRANSFLECTIVE TYPE LCD DEVICE HAVING EXCELLENT IMAGE QUALITY

This application is based upon and claims the benefit of priority from Japanese patent application No. 2007-002854, the disclosure of which is incorporated herein in its entirety by reference.

BACKGROUND OF THE INVENTION

1. Field of the Invention

This invention relates to a transflective type LCD device, and more particularly, to a transflective type LCD device that has a transmissive area which transmits light from the rear surface side to the display surface side to display an image, and a reflective area which reflects light incident from the display surface side to display an image.

2. Description of the Related Art

LCD devices are generally classified into transmissive type LCD devices and reflective type LCD devices. In general, a transmissive type LCD device has a backlight source, and controls the transmission amount of light from the backlight source to thereby display an image. A reflective type LCD device has a reflection film which reflects light from the outside, and utilizes light reflected by the reflection film as a display light source to thereby display an image. The reflective type LCD device, which does not require a backlight source, is superior in reduction of the power consumption, for a smaller thickness and a lower weight, as compared with the transmissive type LCD device. However, since the ambient light is used as a display light source, there is a defect that, when the ambient area is dark, the visibility is lowered.

As an LCD device which has the advantage of the transmissive type LCD device and that of the reflective type LCD device, there is known a transflective type LCD device (for example, refer to Patent Publication JP-2003-344837A. The transflective type LCD device has a transmissive area and a reflective area in each pixel. The transmissive area transmits light from a backlight source, and sets the backlight source as a display light source. The reflective area has a reflection film, and the light incident from the outside and reflected by the reflection film is used as a display light source. In using the transflective type LCD device, in case the ambient area is bright, the backlight source is turned off, and an image is displayed on the screen by the reflective area, which can realize reduction of the power consumption. On the other hand, in case the ambient area is dark, the backlight source is turned on, and an image is displayed on the screen by the transmissive area, which can display the image even if the ambient area is dark.

As the display mode of the LCD device, there are an IPS mode (In-plane-Switching mode) and an FFS mode (Fringe-Field-Switching mode) which are the lateral-direction-electric-field mode excellent in the contrast of transmission and the viewing angle thereof. The LCD device of the lateral-direction-electric-field mode such as the IPS mode and FFS mode has a pixel electrode and a common electrode which are formed on the same substrate, and applies an electric field of the lateral direction to an LC layer. Due to the configuration wherein the LCD device of the lateral-direction-electric-field mode displays an image by rotating LCD molecules in a direction parallel to the substrate, a higher viewing angle can be realized in the lateral-direction-electric-field mode, as compared with an LCD device of the TN mode.

However, in case the transflective type LCD device employs the lateral-direction-electric-field mode such as the IPS mode and FFS mode, as is described in JP-2003-344837A there is raised a problem that display of dark state (black) and display of bright state (white) are inverted. In the usual drive system, when the transmissive area is set to normally black, the reflective area assumes normally white. Hereinafter, the reason of the inverted display will be described. FIG. 20A shows a schematic view indicative of a section of the transflective type LCD device, and FIG. 20B shows a schematic view indicative of the polarized state of light of respective areas when the light advances from a polarizing film, through an LCD layer, and to a polarizing film. An arrow represents that the polarized state of light is the linear polarization, an encircled R represents that the polarized state is the clockwise circular polarization, and an encircled L represents that the polarized state is the counter-clockwise circular polarization. A round bar represents a director (molecule) of LC.

Each of pixels of an LCD device 50 has a reflective area 55 and a transmissive area 56. The reflective area 55 sets reflected light from a reflection film 54 to a display light source, and the transmissive area 56 sets a backlight source, not shown, to a display light source. A polarizing film (first polarizing film) 51 on the viewer side, or front side, and a polarizing film (second polarizing film) 52 on the rear side are arranged such that the polarizing axes thereof are perpendicular to each other. In an LC layer 53, LC molecules are arranged such that the direction of LC molecules upon absence of applied voltage is deviated from the polarizing axis (light transmission axis) of the second polarizing film 52 by 90 degrees. For example, when the polarizing axis of the second polarizing film 52 is at 0 degree, the polarizing axis of the first polarizing film 51 is set to 90 degrees, and the longer axis direction of LC molecules of the LC layer 53 is set to 90 degrees. In the LC layer 53, the cell gap is adjusted such that the retardation $\Delta n \cdot d$ ($\Delta n$ represents the refractive index anisotropy of LC molecules, and "d" represents the cell gap of LC layer) assumes $\lambda/2$ ($\lambda$ is the wavelength of light, and, for example, if green light is selected as the standard light, $\lambda$=550 nm) in the transmissive area 56, while the cell gap is adjusted such that the retardation assumes $\lambda/4$ in the reflective area 55.

Firstly, the operation upon absence of applied voltage on the LC layer 53 will be described.

<Reflective Area, Upon Absence of Applied Voltage>

The reflective area upon absence of applied voltage will be described.

In the reflective area 55, linearly polarized light of 90 degrees direction (longitudinal direction) passing through the first polarizing film 51 advances to the LC layer 53. In the LC layer 53, since the optical axis of the linearly polarized light travelling to the LC layer matches the longer axis direction of LC molecules, the light passes through the LC layer 53 with its polarized state being kept at linearly polarized angle of 90 degrees, and is reflected by the reflection film 54. In case of the linearly polarized light, since the light is kept linearly polarized after being reflected, the light advances to the LC layer 53 again with its polarized state being kept at linearly polarized angle of 90 degrees. Furthermore, while the light advances from the LC layer 53 to be incident onto the first polarizing film 51 with its polarized state being kept at linearly polarized angle of 90 degrees, since the polarizing axis of the first polarizing film 51 is also at 90 degrees, the light passes through the first polarizing film 51. Accordingly, upon absence of applied voltage, the display represents a bright state or black.

<Reflective Area, Upon Presence of Applied Voltage>

The reflective area upon presence of applied voltage will be described.

In the reflective area 55, linearly polarized light of 90 degrees direction (longitudinal direction) passing through the first polarizing film 51 advances to the LC layer 53. Upon presence of applied voltage on the LC layer 53, the longer axis direction of LC molecules in the LC layer 53 is changed from 0 degree to 45 degrees on the substrate surface. In the LC layer 53, since the polarized direction of the incident light is deviated from the longer axis direction of LC molecules by 45 degrees, and the retardation of the LC is set to $\lambda/4$, linearly polarized light of the longitudinal direction, which advances to the LC layer 53, advances to the reflection film 54 with its polarized state being set clockwise-circularly polarized. This clockwise-circularly polarized light is reflected by the reflection film 54 and has its polarized state being set counterclockwise-circularly polarized. The counterclockwise-circularly polarized light, which advances to the LC layer 53, passes through the LC layer 53 again, and has its polarized state being set to linearly polarized state of the lateral direction (0 degree direction) to advance to the first poling film 51. Since the polarizing axis of the first polarizing film 51 is at 90 degrees, the light reflected by the reflection film 54 cannot be made to pass through, and the display represents a dark state.

As described above, in the reflective area, the display assumes the normally white display, in which the display represents a bright state upon absence of applied voltage, while the display represents a dark state upon presence of applied voltage.

<Transmissive Area, Upon Absence of Applied Voltage>

Next, the transmissive area will be described. Firstly, the state upon absence of applied voltage will be described.

In the transmissive area 56, linearly polarized light of the lateral direction passing through the second polarizing film 52 advances to the LC layer 53. In the LC layer 53, since the polarized direction of the incident light is perpendicular to the longer axis direction of LC molecules, without changing the polarized state, the light passes through the LC layer 53 with its polarized state kept linearly polarized of the lateral direction, and advances to the first polarizing film 51. Since the polarizing axis of the first polarizing film 51 is at 90 degrees, the transmitted light cannot pass through the first polarizing film 51 and the display represents a dark state.

<Transmissive Area, Upon Presence of Applied Voltage>

Next, the state upon presence of applied voltage will be described. In the transmissive area 56, linearly polarized light of the lateral direction passing through the second polarizing film 52 advances to the LC layer 53. Upon presence of applied voltage on the LC layer 53, the longer axis direction of LC molecules in the LC layer 53 is changed from 0 degree to 45 degrees on the substrate surface. In the LC layer 53, since the polarized direction of the incident light is deviated from the longer axis direction of LC molecules by 45 degrees, and the retardation of the LC is set to $\lambda/2$, linearly polarized light of the lateral direction, which advances to the LC layer 53, advances to the first polarizing film 51 with its polarized state being set to linearly polarized state of the longitudinal direction. Accordingly, in the transmissive area 56, the first polarizing film 51 allows the backlight incident onto the second polarizing film 52 to pass therethrough, and the display represents a bright state or white.

As described above, in the transmissive area, the display assumes a normally black mode, in which the display represents a dark state upon absence of applied voltage, while the display represents a bright state upon presence of applied voltage.

As a method to solve above-described problems, JP-2006-180200A describes a device configuration for solving the problem of the display inversion between the transmissive area and the reflective area, while using a specific signal processing and driving technique for the LCD device. The LCD device described in JP-2006-180200A is a transflective type LCD device including a pair of polarizing films which have an LC layer sandwiched therebetween. The polarizing films have polarizing axes which are perpendicular to each other. Each pixel of the LCD device includes a transmissive area and a reflective area and is driven by the lateral-electric-field mode, wherein the longer axis of LC molecules in the LC layer is parallel or perpendicular to the polarized direction of light which advances to the LC layer in the transmissive area. Each pixel has a pixel electrode arranged in a transmissive area and a reflective area of the pixel which is driven by a common data signal, a first common electrode to which a first common signal which is shared by reflective areas of a plurality of pixels is applied, and a second common electrode to which a second common signal which is shared by transmissive areas of the plurality of pixels is applied.

FIG. 21 shows a schematic view indicative of the planar configuration in a single pixel of the LCD device described in JP-2006-180200A. An LCD device 100 includes a first common electrode 137 which corresponds to a reflective area 121, a second common electrode 138 which corresponds to a transmissive area 122, and a pixel electrode 135 which supplies a common data signal to the reflective area 121 and transmissive area 122. In the reflective area 121, the LC layer is driven by an electric field generated by the pixel electrode 135 and the first common electrode 137, and in the transmissive area 122, the LC layer is driven by the electric field generated by the pixel electrode 135 and the second common electrode 138. In this configuration, since a signal (electric potential) applied to the first common electrode 137 and a signal applied to the second common electrode 138 are controlled such that the magnitude of electric field applied to the LC layer in the reflective area 121 and the magnitude of electric field applied to the LC layer in the transmissive area 122 are opposite to each other, the display in the reflective area and the display in the transmissive area have the same display mode. Accordingly, the problem of the transflective type LCD device, or the problem of the inversion of display of a bright/dark state between the reflective area and the transmissive area can be solved.

Specifically, a first common signal and a second common signal supplied to the first common electrode 137 and the second common electrode 138, respectively, are inverted in synchrony with a pixel signal supplied to the pixel electrode 135, wherein the first common signal is obtained by substantially inverting the second common signal. In this case, for example, when an electric potential of 5 V is applied to the pixel electrode 135 in the reflective area 121 and transmissive area 122, by setting the first common electrode 137 to 0 V, and setting the second common electrode 138 to 5 V, the LC layer can be rotated only in the reflective area 121, and the problem of the inversion of display of bright state and display of dark state between the reflective area 121 and the transmissive area 122 can be solved. In employing this configuration, it is not necessary that the first common signal and the second common signal have to be inverted signals in a strict sense. For example, the first common signal may assume 0 V or 5 V, and the second common signal may to assume 6 V or 0 V. Hereinafter, the drive system for LCD device in JP-2006-180200A is referred to as an inverting drive system using an inverting drive scheme, for the sake of convenience.

On the other hand, in the transflective type LCD device, in order to allow the image quality in the reflective mode to match the image quality in the transmissive mode, it is important that the voltage-luminance characteristics including VR (voltage-reflectance) characteristics and VT (voltage-transmittance) characteristics in the reflective area matches those in the transmissive area. For example, in a literature entitled "A single Gap Transflective Fringe-Field Switching Display", SID2006 P159 (p. 810), there is described an LCD device that performs the FFS drive mode with the same gap setup in a reflective area and in a transmissive area. In this technique, the LCD is of the transflective type and uses the lateral-electric-field mode without using an inverting drive system, wherein an in-cell retarder is used only in the reflective area, to optically solve the problem of the inversion between the reflective area and the transmissive area, and then, the VR characteristics and VT characteristics are allowed to match between the reflective area and the transmissive area. The technique solving the problem is such that the transmissive area is driven using the FFS-mode drive, and the reflective area is driven using the IPS-mode drive, and the angle formed between electrodes in the form of comb teeth and the rubbing angle in the transmissive area is set to approximately 80 degrees, and the angle formed between electrodes in the form of comb teeth and the rubbing angle in the reflective area is set to approximately 45 degrees, which makes the VT/VR characteristics match between both the areas. This technique compensates the difference between both the drive voltages, which occurs due to the same cell gap provided in the reflective area and the transmissive area.

In the configuration described in the JP-2006-180200A, both the VT characteristics and VR characteristics are opposite to each other. That is, the VT characteristics is such that a higher voltage provides a higher transmittance whereas the VR characteristics is such that a higher voltage provides a lower reflectance, thereby raising a problem that the image quality in the reflective mode does not match the image quality in the transmissive mode. A method to solve the problem of the image quality in the inverting drive scheme is not known. It is recited in the above literature that, with respect to the problem that the VR characteristic and VT characteristic have a deviation therebetween due to the same cell gap being provided in the reflective mode and transmissive mode, only the angle formed between electrodes in the form of comb teeth and the rubbing angle has a difference between the reflective area and the transmissive area That is, this technique is silent to the solution for allowing the image quality in the reflective mode to match the image quality in the transmissive mode.

SUMMARY OF THE INVENTION

It is therefore an object of the present invention to solve the above problem and to provide a transflective type LCD device driven using the inverting drive scheme, which is capable of allowing the image quality in the reflective mode to match the image quality in the transmissive mode.

The present invention provides, in a first aspect thereof, a transflective liquid crystal display (LCD) device including an LCD panel having an array of pixels each having a reflective area and a transmissive area in a liquid crystal (LC) layer, and a drive circuit for driving the reflective area and the transmissive area of the LC layer by using an inverting drive scheme, wherein characteristics of reflectance of the reflective area with respect to a value of [Vr(K)−Vr] and characteristics of transmittance of the transmissive area with respect to a value of [Vt−Vt(K)] substantially match each other, where Vr and Vt are drive voltages of the LC layer in the reflective area and transmissive area, respectively, Vr(K) is a dark-state setup voltage in the reflective area, and Vt(K) is a dark-state setup voltage in the transmissive area.

The present invention provides, in a second aspect thereof, a transflective liquid crystal display (LCD) device including: an LCD panel including an array of pixels each having a reflective area and a transmissive area in a liquid crystal (LC) layer; and a drive circuit for driving the reflective area and the transmissive area of the LC layer by using an inverting drive scheme, wherein: the drive circuit drives the reflective area and the transmissive area by using drive voltages Vr and Vt, respectively, the reflective area has a dark-state setup voltage Vr(K) and a bright-state setup voltage Vr(W), and the transmissive area having a dark-state setup voltage Vt(K) and a bright-state setup voltage Vt(W); a first characteristic curve for reflectance of the reflective area with respect to a value of [Vr(K)−Vr] and a second characteristic curve for transmittance of the transmissive area with respect to a value of [Vt−Vt(K)] have therebetween a relationship such that: a slope of the first characteristic curve in a vicinity of the Vr(K), a slope of the first characteristic curve in a vicinity of the Vr(W), a slope of the second characteristic curve in a vicinity of the Vt(K), and a slope in a vicinity of the St(W) substantially match one another.

The above and other objects, features and advantages of the present invention will be more apparent from the following description, referring to the accompanying drawings.

DETAILED DESCRIPTION OF EMBODIMENTS

Figure 1:
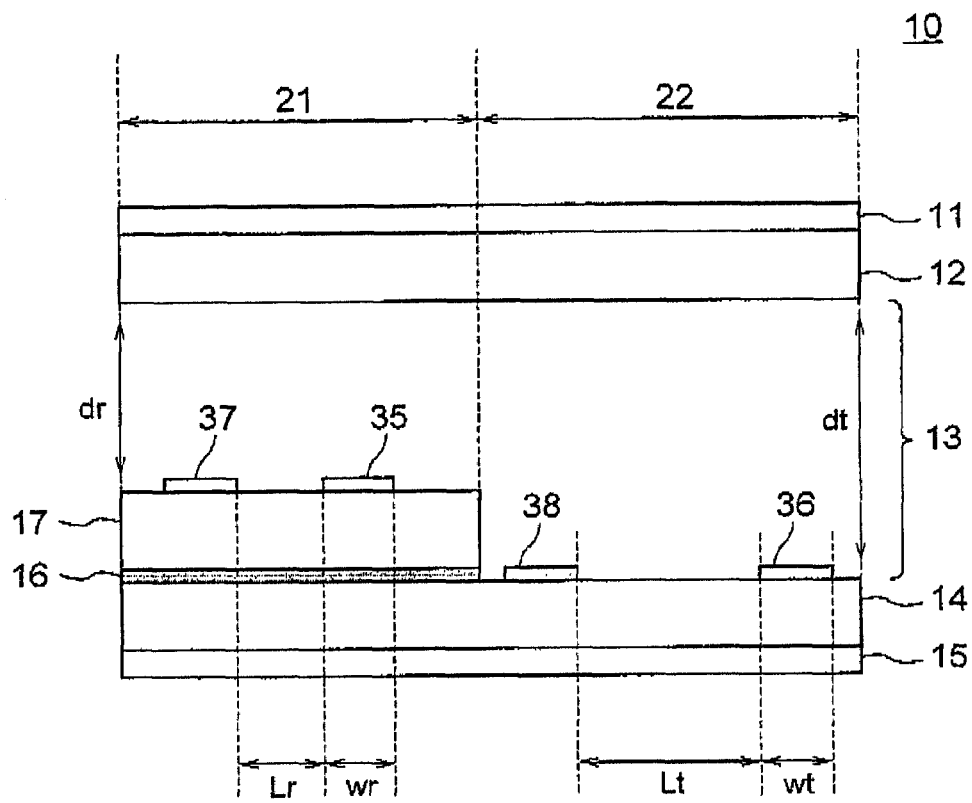
FIG. 1 is a sectional view indicative of the configuration of an LCD device according to an embodiment of the present invention.

Before describing exemplary embodiments of the present invention, the principle of the present invention will be described for a better understanding of the present invention.

The present inventors examined necessary conditions to solve the problem of the mismatching in the image quality between the reflective area and the transmissive area. The result of the experiments revealed the following facts. It is assumed here that the dark-state setup voltage and bright-state setup voltage for LC layer in the reflection area are Vr(K) and Vr(W), respectively, the dark-state setup voltage and bright-state setup voltage for LC in the transmissive area are Vt(K) and Vt(W), respectively, and the applied voltage on the LC layer in the reflective area and the transmissive are Vr and Vt respectively. In this case, if the relationship between (Vr(K)–Vr) and the reflectance in the reflection area, which relationship is referred to as inverted VR characteristic and represented by ([Vr(K)–Vr]–R) characteristics, is allowed to match the relationship between (Vt–Vt(K)) and the transmittance in the transmission area, which relationship is referred to as VT characteristic and represented by ([Vt–Vt(K)]–T) characteristics, this is equivalent to match the image quality in the reflection area and the image quality in the transmission area.

Now, exemplary embodiments of the present invention will be described with reference to accompanying drawings, wherein similar constituent elements are designated by similar reference numerals throughout the drawings.

FIG. 1 shows the configuration of an LCD device according to an exemplary embodiment of the present invention. The LCD device 10 includes an LCD panel that includes a pair of transparent substrates, which include counter substrate 12 and TFT substrate 14, an LC layer 13 sandwiched between the paired transparent substrates 12, 14, and a pair of polarizing films 11, 15, which are provided on the sides of the paired transparent substrates far from the LC layer 13 and arranged such that the polarizing axes thereof extend perpendicular to each other. The LCD device 10 further includes a backlight source or backlight unit, not shown, arranged on the surface of the LCD panel far from the viewer of the LCD device. In the LC layer 13, LC molecules are so arranged as to be substantially parallel to the transparent substrates, and the LCD device 10 is configured as an LCD device of the lateral-electric-field mode (IPS mode).

The LCD panel has a reflective area 21 and a transmissive area 22. In the transmissive area 22, there are formed a transmissive-area pixel electrode 36 and a transmissive-area common electrode 38, to generate an electric field in a direction substantially parallel to the transparent substrates. In the reflective area 21, there is arranged a reflection film 16 that reflects light incident from the side of the polarizing film 11, and allows the reflected light to pass by the polarizing film 11. On the reflection film 16, a transparent insulating film 17 is formed, and on the transparent insulating film 17, a reflective-area pixel electrode 35 and a reflective-area common electrode 37 are provided to generate an electric field therebetween in a direction substantially parallel to the substrates.

The reflection film 16 is configured as a micromirror so as to scatter the incident light in a variety of directions. The micromirror is configured by forming concavities and convexities on a photosensitive resin by employing the photolithographic and stamping technique, and arranging a metal film made of Al, Ag or an alloy thereof on the thus formed concavities and convexities. With respect to the thickness of the LC layer 13, in the transmissive area 22, the cell gap is formed such that the phase difference of the LC layer 13 assumes ½ upon presence of applied voltage, and, in the reflective area 21, the cell gap is formed such that the phase difference of the LC layer 13 assumes ¼ upon presence of applied voltage. That is, the cell gap dr in the reflective area 21 is approximately half the cell gap dt in the transmissive area 22.

Hereinafter, an example of the present embodiment will be described. In a first example, the clearance of the comb teeth electrodes, which is defined as clearance Lr between the reflective-area common electrode 37 and the reflective-area pixel electrode 35, is suitably determined in the reflective area 21. The inverted VR characteristics and the VT characteristics match each other. As the LC layer 13, a layer having a refractive index anisotropy set to $\Delta n=0.090$, and a permittivity anisotropy set to $\Delta \epsilon=13.5$ is used. With respect to the transmissive area 22, so as to set the drive voltage to 5 V or lower, which is typical as the output voltage of an LC driver, the cell gap is set to dt=3.5 μm, the comb teeth width, which is the width of the transmissive-area pixel electrode 36 and transmissive-area common electrode 38, is set to wt=3 μm, and the comb teeth clearance, which is the clearance between the reflective-area common electrode 37 and the reflective-area pixel electrode 35 is set to Lr=9 μm.

Figure 2:
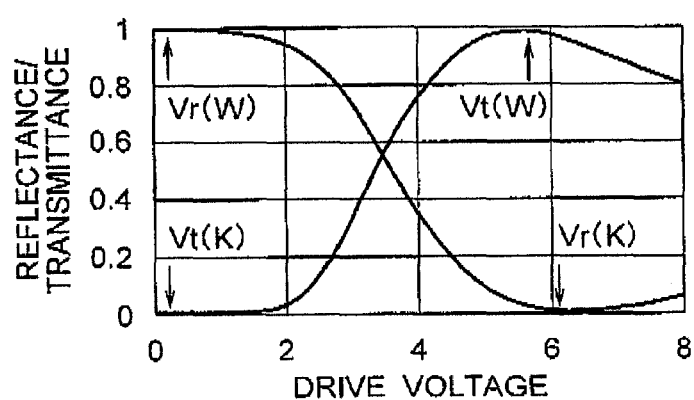
FIG. 2 is a graph indicative of the relationship between an applied voltage and the reflectance/transmittance in the LC layer.

In general, in a lateral-electric-field mode LCD device, assuming that the cell gap is set to "d", and the comb teeth clearance is set to "l", the threshold voltage Vth, which is an initial rise voltage of the reflectance in the reflectance-voltage characteristics, is proportional to (l/d). Thus, with respect to the reflective area 21, considering the cell gap is dr=1.8 μm, the comb teeth width is selected at wr=3 μm, and the comb teeth clearance is selected at lr=4.5 μm. The relationship between the applied voltage and the reflectance/transmittance of the LC layer in this case is shown in FIG. 2. In this figure, the dark-state setup voltage Vt(K) and bright-state setup voltage Vt(W) in the transmissive area 22 are set to Vt(K)=0 V and Vt(W)=5 V, the dark-state setup voltage Vr(K) and bright-state setup voltage Vr(W) in the reflective area 21 are set to Vr(K)=5 V and Vr(W)=0 V, and the inverted VR characteristics and the VT characteristics are plotted. It will be understood from FIG. 3 that the inverted VR characteristics and the VT characteristics approximately match each other.

Figure 3:
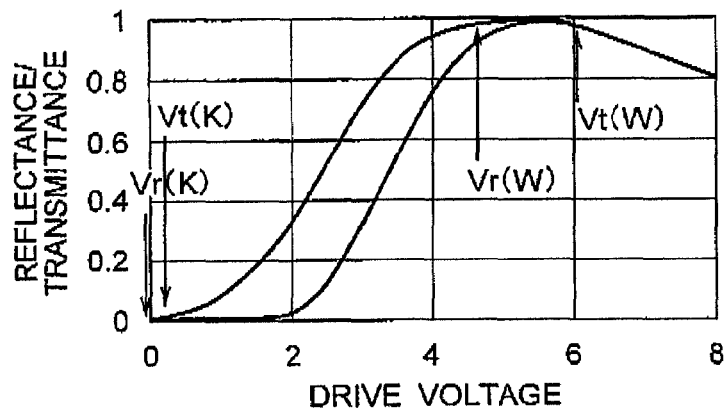
FIG. 3 is a graph indicative of the inverted VR characteristics and the VT characteristics in a first example.
Figure 4:
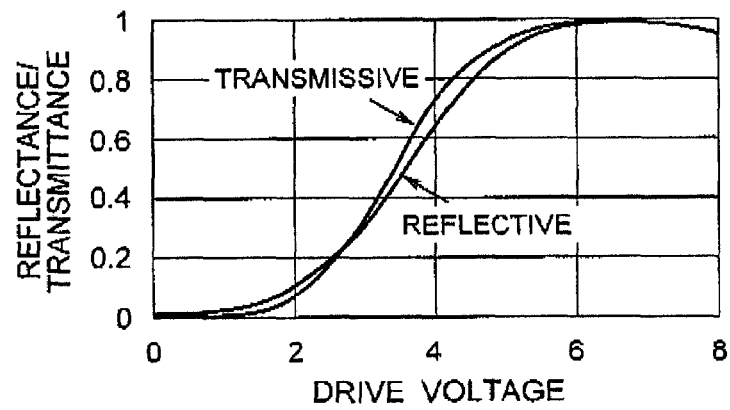
FIG. 4 is a graph indicative of another example of the inverted VR characteristics and the VT characteristics in the first example.

In FIG. 3, although it can be seen that the inverted VR characteristics and the VT characteristics approximately match each other, if the image quality in the transmissive mode is made optimum, the image quality in the reflective mode is deviated toward a bright state. Accordingly, so as to realize the further optimization, in the reflective area 21, the comb teeth width wr is set to 3 µm, and the comb teeth clearance lr is set to 3.0 µm. The inverted VR characteristics and the VT characteristics in this case are shown in FIG. 4. It will be understood from FIG. 4 that the inverted VR characteristics and the VT characteristics her match each other as compared with the case shown in FIG. 3, and it can be seen that the image quality in the reflective mode and the image quality in the transmissive mode further match each other. On the other hand, in this case, since the LC molecules on the comb teeth do not rotate, and only the LC molecules on the gap between the comb teeth rotate, whereby the contrast ratio in the reflective mode is lowered.

Next, the second example will be described. In this example, by improving the manner of driving the LC layer 13, the inverted VR characteristics and the VT characteristics are allowed to further match each other without lowering the contrast ratio in the reflective mode. As the LC layer 13, similar to the first example, a layer having a refractive index anisotropy set to $\Delta n=0.090$, and a permittivity anisotropy set to $\Delta\epsilon=13.5$ is used. Furthermore, in the transmissive area 22, the cell gap dt is set to 3.5 µm, the comb teeth width wt is set to 3 µm, and the comb teeth clearance lt is set to 9 µm. With respect to the comb teeth width wr and comb teeth clearance lr in the reflective area 21, considering that the threshold voltage of LC is proportional to (1/d), and that the cell gap is dr=1.8 µm, it is determined that wr=3 µm, and lr=4.5 µm.

The relationship between the applied voltage and the reflectance/transmittance of the LC layer in this case is shown in FIG. 2. In FIG. 2, the dark-state setup voltage Vt(K) and bright-state setup voltage Vt(W) in the transmissive area 22 are set to Vt(K)=0 V and Vt(W)=5 V, and the dark-state setup voltage Vr(K) and bright-state setup voltage Vr(W) in the reflective area 21 are set to Vr(K)=5 V and Vr(W)=0 V, and the inverted VR characteristics and the VT characteristics are plotted, whereby a graph shown in FIG. 3 is obtained. It will be understood from FIG. 3 that the inverted VR characteristics and the VT characteristics approximately match each other. However, it can be seen that, when the image quality in the transmissive mode is made optimum, the image quality in the reflective mode is deviated toward the bright state.

Figure 5:
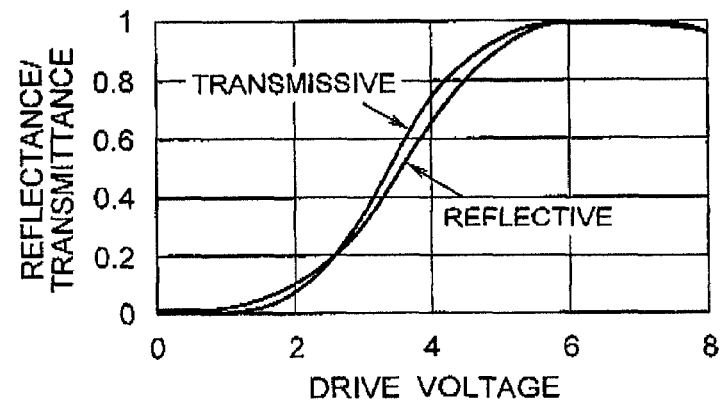
FIG. 5 is a graph indicative of the inverted VR characteristics and the VT characteristics in a second example.
Figure 15:
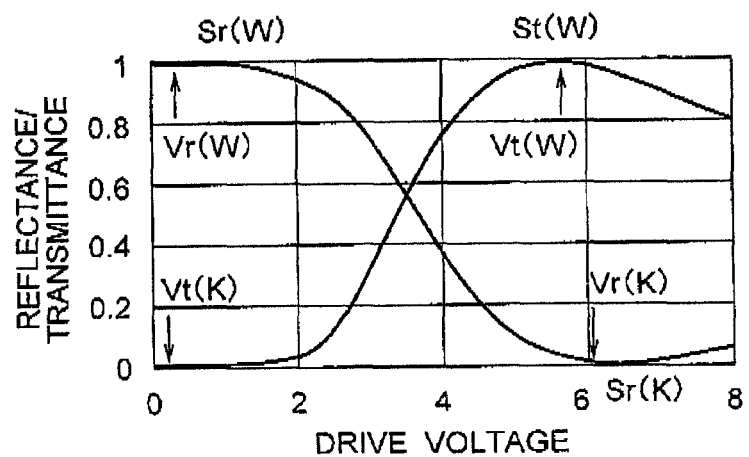
FIG. 15 is a graph indicative of the inverted VR characteristics and the VT characteristics in a fourth example.

Accordingly, the LC drive voltage is optimized so that the inverted VR characteristics and the VT characteristics match each other. FIG. 15 shows the inverted VR characteristics and the VT characteristics when the dark-state setup voltage Vr(K) and bright-state setup voltage Vr(W) in the reflective area 21 are set to Vr(K)=6.5 V and Vr(W)=0 V, and the dark-state setup voltage Vt(K) and bright-state setup voltage Vt(W) in the transmissive area 22 are set to Vt(K)=0 V and Vt(W)=5 V. It will be understood from FIG. 5 that, by setting the applied voltage for the dark-state setup in the reflective area 21 different from the applied voltage for the bright-state setup in the transmissive area 22, it is possible to allow the inverted VR characteristics and the VT characteristics match each other, which can allow the image quality in the reflective mode and the image quality in the transmissive mode match each other.

Figure 6:
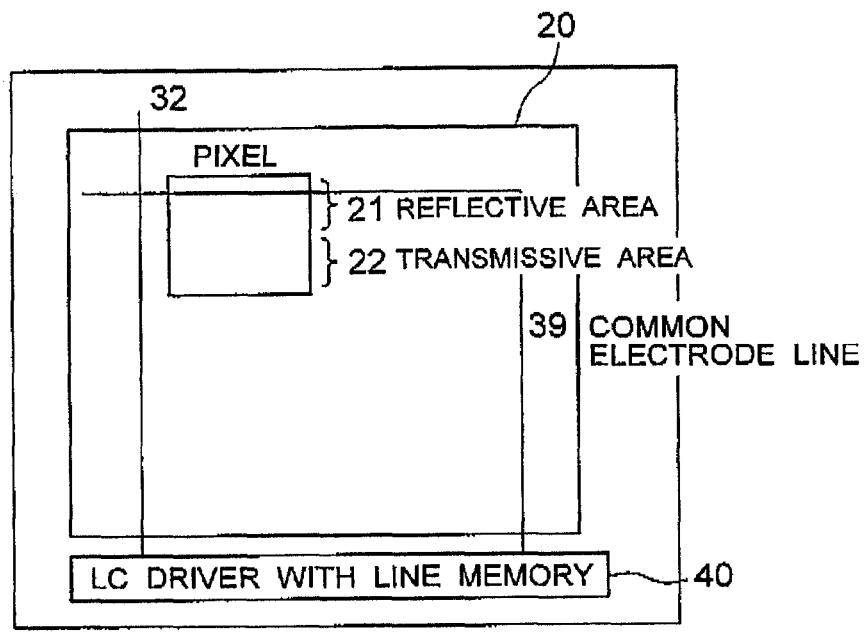
FIG. 6 is a block diagram indicative of an LCD device including an LC driver.

Next a specific example of the method of generating data signals during the line-selection time period will be described. The generated data signals include a data signal (reflective electric potential) corresponding to the reflective area 21 in the reflective-area selection time period, and a data signal (transmissive electric potential) corresponding to the transmissive area 22 in the transmissive-area selection time period. FIG. 6 shows an LCD device including an LCD panel 20 and an LC driver 40 that drives the LCD panel 20. To the LC driver 40, a timing signal used for timing of signal transmission, and digital signals (D (n, m)) of, for example, approximately RGB 8 bits corresponding to respective pixels are input in series for the respective pixels. Based on the input pixel signals and timing signal, the LC driver 40 generates a gate signal to be supplied to a gate line corresponding to the reflective area 21 and a gate line corresponding to the transmissive area 22, a data signal to be supplied to a data line 32, and a common electrode signal to be supplied to a common electrode line 39. The common electrode line 39 is connected to the reflective-area common electrode 37 in the reflective area 21 and to the transmissive-area common electrode 38 in the transmissive area 22.

Figure 7:
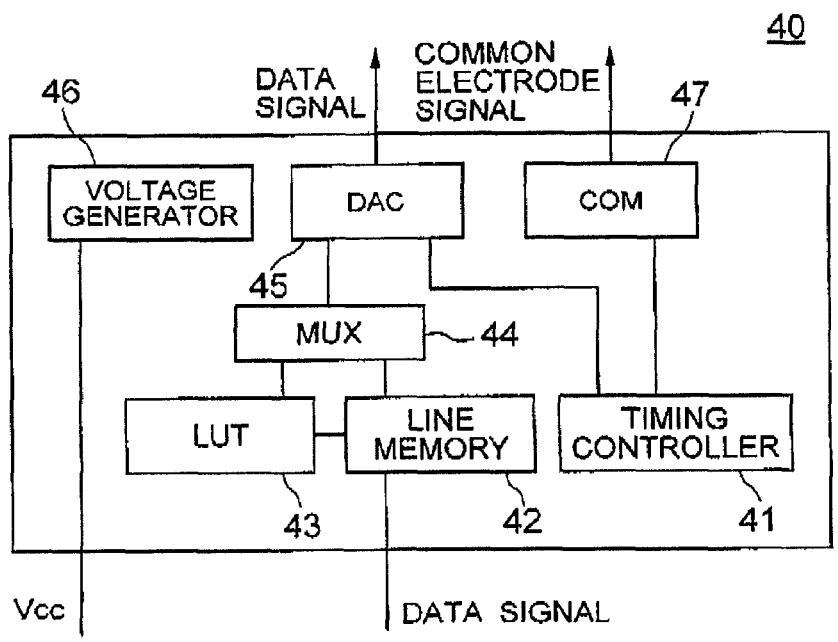
FIG. 7 shows a block diagram indicative of the configuration of an LC driver.

FIG. 7 shows the configuration of the LC driver 40. The LC driver 40 includes a timing controller 41, a line memory 42, a LUT (look-up table) circuit 43, a selection circuit (MUX circuit) 44, a digital-to-analog conversion SAC) circuit 45, a voltage generation circuit 46, and a COM signal circuit 47. The timing controller 41 includes a gate-timing generation section and a data-timing generation section, and generates a variety of timing signals based on the input timing signal. The LC driver 40 separates the timing for one gate line into a first timing for the reflective area (reflective-area selection time period) and a second timing for the transmissive area (transmissive-area selection time period), and drives the gate lines in the reflective area and transmissive area under the separate timings. Respective gate signals are generated in the LC driver 40, and are supplied to the gate line corresponding to the reflective area 21 and the gate line corresponding to the transmissive area 22. In an alternative, gate signals may be generated using a shift register configured by TFTs on the TFT substrate.

The line memory 42 stores therein input digital pixel signals D (n, m) for one data line. The LUT circuit 43 performs the gradation conversion in accordance with an LUT for a pixel gradation conversion means in the transmissive area. The MUX circuit 44 selectively outputs a digital pixel signal to be stored in the line memory 42, and a digital pixel signal which has its gradation converted by the LUT circuit 43. The DAC circuit 45 generates, based on the digital pixel signal input from the MUX circuit 44, and the voltage generated by the voltage generation circuit 46, a voltage signal (data signal) corresponding to the gradation for the digital pixel signal. The COM signal circuit 47 generates a common electrode signal to be supplied to the common electrode line 39 of the respective pixels.

The digital pixel signals D (n, m) input to the LC driver 40 are temporarily stored in the line memory 42. The LUT circuit 43 performs the gradation conversion in accordance with the LUT, and generates a digital pixel signal for the transmissive area corresponding to the transmissive mode. The MUX circuit 44 selects, in the transmissive-area selection time period, the digital pixel signal for the transmissive area which is generated by the LUT circuit 43, and delivers the thus selected digital pixel signal for the transmissive area to the DAC circuit 45. Furthermore, the MUX circuit 44 selects, in the reflective-area selection time period, a digital pixel signal for the reflective area which is stored in the line memory 42 and does not pass through the LUT circuit 43, and delivers the thus selected digital pixel signal for the reflective area to the DAC circuit 45. Accordingly, digital pixel signals which are different in gradation are input to the DAC circuit 45 under the reflective mode and transmissive mode.

In this case, a reference voltage VDD upon forming a signal voltage in the LC driver 40 is set to VDD=6.5 V, and in the voltage generation circuit 46, reference voltages of V= 0 V, . . . =6.5 V are generated. As the LC driver, a driver of 8 bits (256 gradations) is used, and a voltage is arbitrarily selected therefrom, and 64 gradations and 6 bits are displayed. The DAC circuit 45 outputs voltages corresponding to input 0 to 255 gradations, in the reflective-area selection time period, and outputs 6.5 V for 0 gradation, 5 V for 5 gradation, and 0 V for 255 gradation. That is, the DAC circuit 45 outputs, in the reflective mode, a signal of 6.5 V to the data line 32 corresponding to 0 gradation (dark or black) of a digital pixel signal, and, a signal of 0 V to the data line 32 corresponding to 255 gradation (bright or white).

The LUT circuit 43 outputs, using a LUT, 255 to 5 gradation with respect to 0 gradation to 255 gradation of the input digital pixel signal. That is, when an input digital pixel signal is 0 gradation (black), the LUT circuit 43 outputs 255 gradation to the DAC circuit 45, and when an input digital pixel signal is 255 gradation (white), the LUT circuit 43 outputs 5 gradation to the DAC circuit 45. Accordingly, the DAC circuit 45 outputs, in the transmissive mode time (transmissive-area selection time period), corresponding to 0 gradation (black) of an input digital signal, a signal of 0 V being the voltage for 255 gradation in the reflective mode to the data line 32, and outputs, corresponding to 255 gradation (white), a signal of 5 V being the voltage for 5 gradation in the reflective mode to the data line 32. By performing the gradation conversion in the LUT circuit 43, it is possible to realize dark-state setup voltage Vr(K)=6.5 V and bright-state setup voltage Vr(W)=0 V in the reflective area 21, and dark-state setup voltage Vt(K)= 0 V and bright-state setup voltage Vt(W)=5 V in the transmissive area 22.

Figure 8:
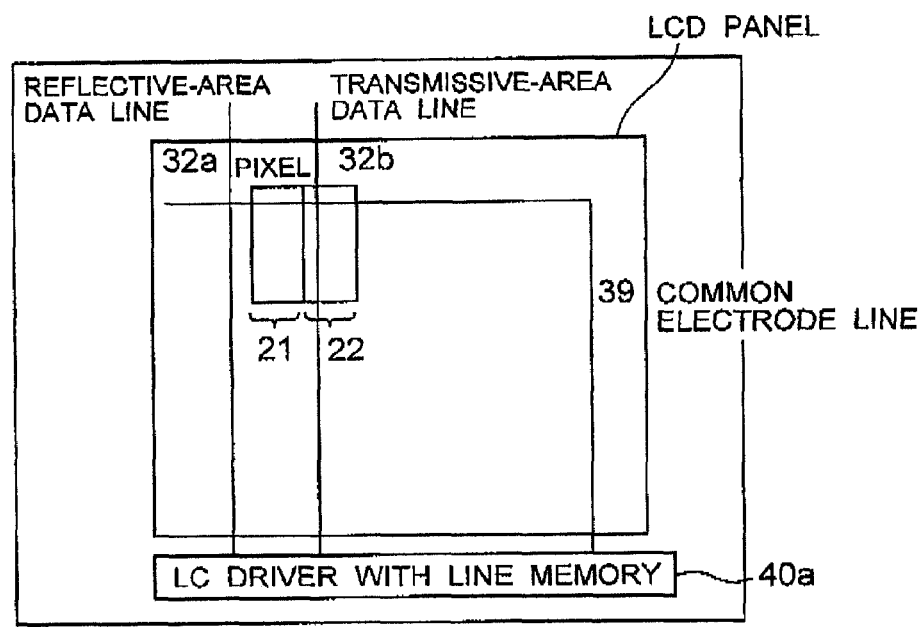
FIG. 8 is a block diagram indicative of another example of the configuration of an LCD device including an LC driver in the second example.
Figure 9:
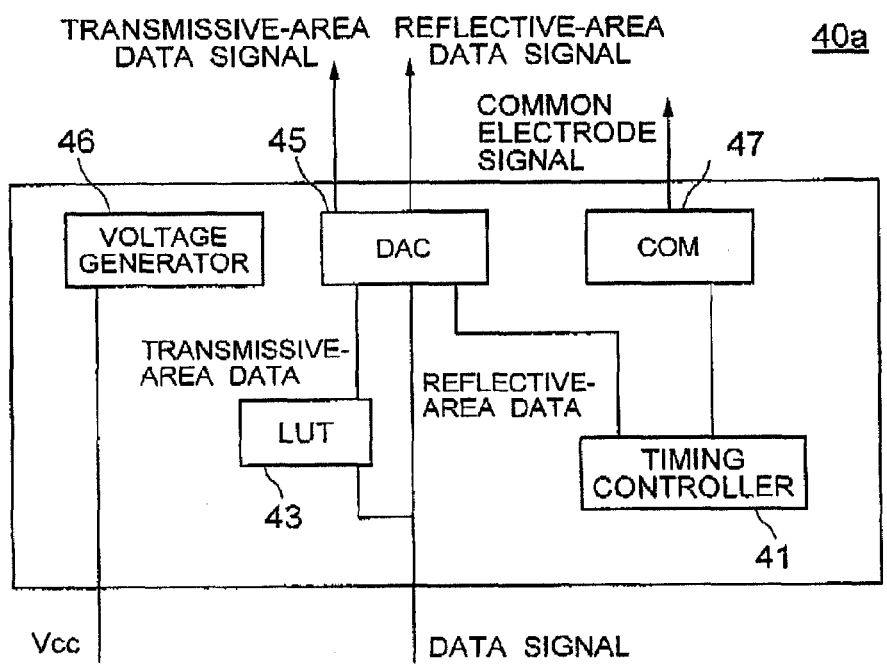
FIG. 9 is a block diagram indicative of another example of the configuration of an LC driver in the second example.

In the above description, the digital pixel signal for the transmissive area is generated using the line memory 42, and the signal voltage supplied to the data line 32 in the reflective-area selection time period is different from that in the transmissive-area selection time period. On the other hand, instead of this configuration, there may be employed a configuration in which a digital pixel signal for the transmissive area is generated from each input digital pixel signal. More specifically, as shown in FIG. 8, a data line is separated into a reflective data line 32*a* and a transmissive data line 32*b*. An LC driver 40*a* for driving the data lines is shown in FIG. 9, wherein an input digital pixel signal is input to the LUT circuit 43 without using a line memory. The digital pixel signal for the transmissive area is generated from the input digital pixel signal corresponding to the gradation in the reflective area 21 by using the LUT circuit 43. Accordingly, an operation similar to the above-described operation can be realized.

As described above, different amplitudes are provided to the common signal for the reflective area and the common signal for the transmissive area in the present embodiment. This allows the drive voltage for the reflective area to be larger than the drive voltage for the transmissive area. It is noted in the first embodiment that, if the bright-state setup voltage Vt(W) in the transmissive area is to be equal to the dark-state setup voltage Vr(K) in the reflective area, a clearance lr of 3 μm or smaller should be assured between the electrodes in the reflective area for the case of a clearance of lt=9 μm being provided between the electrodes in the transmissive area. On the other hand, in the present embodiment, it is sufficient that the clearance lt between the electrodes in the reflective area be as large as 4.5 μm. Accordingly, the area of the comb-teeth electrodes per pixel area may be relatively smaller in the present embodiment, whereby a larger area can be assured for the gap between the comb-teeth electrodes, where the LC molecules are driven by the drive voltage. This solves the problem of a possible reduction of the contrast ratio in the reflective mode, which may arise in the first embodiment.

Next, a third example will be described. In the third example, similar to the second example, by improving the manner of driving the LC layer 13, the inverted VR characteristics and the VT characteristics are made to match each other. As the LC layer 13, similar to the first and second examples, a layer having a refractive index anisotropy of Δn=0.090, and a permittivity anisotropy of Δε=13.5 is used. Furthermore, in the transmissive area 22, the cell gap dt is set to 3.5 μm, the comb teeth width wt is set to 3 μm, and the comb teeth clearance lt is set to 9 μm. With respect to the comb teeth width wr and comb teeth clearance lr in the reflective area 21, considering that the threshold voltage of LC is proportional to (1/d) and that the cell gap is dr=1.8 μm, it is determined that wr=3 μm, and lr=4.5 μm.

Figure 10:
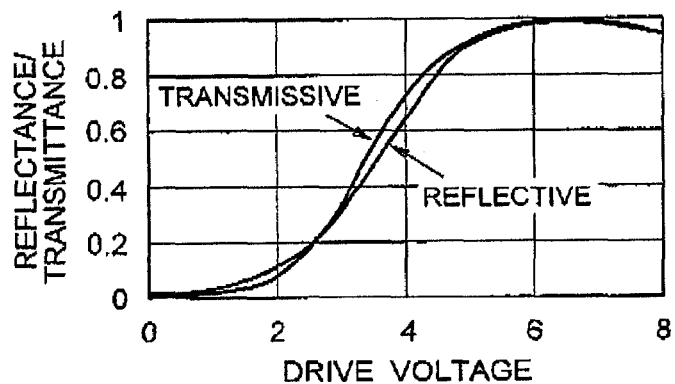
FIG. 10 is a graph indicative of the inverted VR characteristics and the VT characteristics in a third example.

FIG. 10 shows the inverted VR characteristics and the VT characteristics when the dark-state setup voltage Vr(K) and bright-state setup voltage Vr(W) in the reflective area 21 are set to Vr(K)=6.0 V and Vr(W) 1.0 V, and the dark-state setup voltage Vt(K) and bright-state setup voltage Vt(W) in the transmissive area 22 are set to Vt(K)=0 V and Vt(W)=5 V. In FIG. 10, by setting the applied voltage for the dark-state setup in the reflective area 21 different from the applied voltage for the bright-state setup in the transmissive area 22, it is possible to allow the inverted VR characteristics and the VT characteristics to match each other. This configuration allows the image quality in the reflective mode and the image quality in the transmissive mode to match each other.

Figure 11:
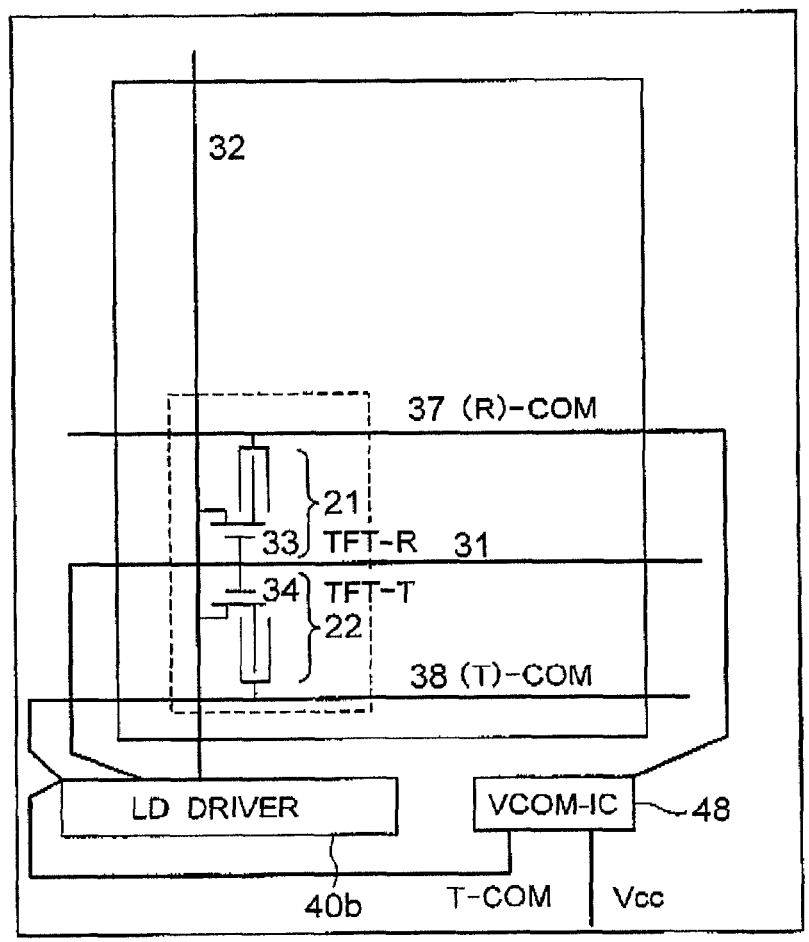
FIG. 11 is a block diagram indicative of the LCD device including an LC driver in the third example.

The difference between this example and the second example is at, in the second example, the voltage supplied to the data line in the reflective-area selection time period is different from that in the transmissive-area selection time period to realize the inverting drive scheme, whereas in this example, the voltage supplied to the common electrode in the reflective area 21 is different from that in the transmissive area 22 to realize the inverting drive scheme. This inverting drive scheme can be realized in the following manner. FIG. 11 shows an LCD device of the third example, which includes an LCD panel and an LC driver. In respective pixels, corresponding to the reflective area 21 and transmissive area 22, a TFT-R 33 and a TFT-T 34 are arranged as switching elements. Furthermore, in the display area, a common gate line 31 for driving the TFT-R 33 and TFT-T 34, and a common data line 32 that supplies a pixel signal to the pixel electrode through the TFT are so formed as to be perpendicular to each other.

In each pixel, the reflective-area pixel electrode 35 (FIG. 1) and transmissive-area pixel electrode 36 are formed in the reflective area 21 and transmissive area 22, respectively. The reflective-area pixel electrode 35 and transmissive-area pixel electrode 36 each have a portion extending in parallel to the gate line 31 and another portion protruding in the display area. In the reflective area 21 the reflective-area common electrode 37 is formed at a position opposing the reflective-area pixel electrode 35 on the plane of the substrate surface. In the transmissive area 22, the transmissive-area common electrode 38 is formed at a position opposing the transmissive-area pixel electrode 36 on the plane of the substrate surface. The reflective-area common electrode 37 and transmissive-area common electrode 38 are supplied with predetermined signals which are shared by respective pixels in the LCD device (reflective-area common electrode signal and transmissive-area common electrode signal).

To an LC driver 40*b*, a timing signal for LC, and digital signals of, for example, approximately RGB 8 bits corresponding to respective pixels are input in series for the respective pixels. The LC driver 40*b* generates, based on the input pixel signals and timing signal, a gate signal to be supplied to the gate line 31, and a data signal to be supplied to the data line 32. Furthermore, the LC driver 40b generates a transmissive-area common electrode signal T-COM to be supplied to the transmissive-area common electrode 38 disposed in the transmissive area 22. The transmissive-area common electrode signal T-COM output from the LC driver 40b is input to a VCOM-IC 48. The VCOM-IC 48 inverts the transmissive-area common electrode signal T-COM, and generates a reflective-area common electrode signal R-COM which has its amplitude amplified.

Figure 12:
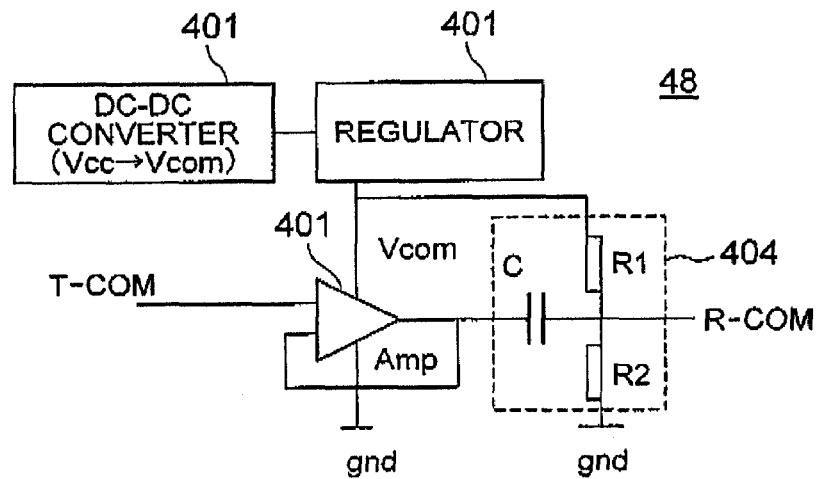
FIG. 12 is a block diagram indicative of the configuration of a VCOM-IC.

The configuration of the VCOM-IC 48 is shown in FIG. 12. A DC-DC converter 401 and a regulator 402 are configured as a voltage step-up circuit that generates a voltage Vcom for the common electrode signal from a logic voltage VCC. An inverting amplifier 403 inverts the transmissive-area common electrode signal T-COM. The signal inverted by the inverting amplifier 403 is output as the reflective-area common electrode signal R-COM through an R-C circuit 404 that adjusts the center voltage. The center voltage of the reflective-area common electrode signal R-COM is set to a voltage which is equal to the median of the amplitude of a pixel electrode signal and the transmissive-area common electrode signal.

The operation in this example will be described. In this operation, a reference voltage VDD for generating a signal voltage in the LC driver 40b is selected at VDD=5 V. The amplitude of the pixel electrode signal and the transmissive-area common electrode signal T-COM is set to 0 V through 5 V. The VCOM-IC 48 can generate a voltage (Vcom) of 7 V, and the amplitude of the reflective-area common electrode signal R-COM generated by the VCOM-IC 48 is set to 0 V through 7 V.

Figure 13A:
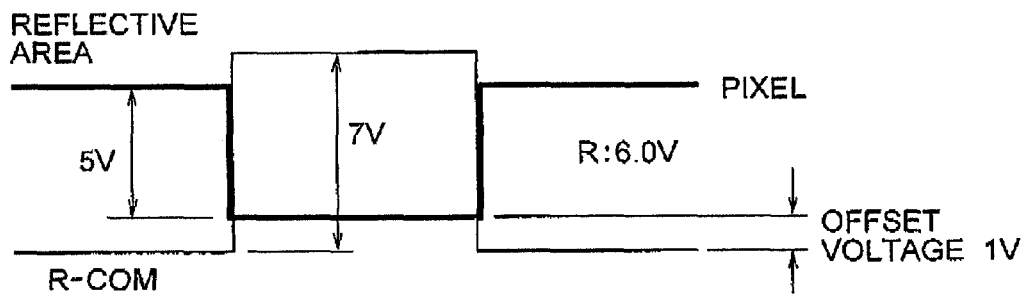
FIG. 13A and FIG. 13B are timing chart showing waveforms of driving the LCD device to assume a dark state in both the reflective area and transmissive area.
Figure 13B:

Firstly, display of dark state will be described. FIG. 13A and FIG. 13B show drive waveforms of display for dark state in the reflective area 21 and transmissive area 22, respectively. In the transmissive area 22, as shown in FIG. 13B, the phase of a pixel voltage (Pixel) to be supplied to the transmissive-area pixel electrode 36 and the phase of the voltage of the transmissive-area common electrode signal T-COM to be supplied to the transmissive-area common electrode 38 match each other, and the amplitude is 5 V, respectively. Accordingly, the drive voltage assumes 0 V, and dark-state setup voltage Vt(K)=0 V. On the other hand, in the reflective area 21, as shown in FIG. 13A, the amplitude of a pixel voltage (Pixel) to be supplied to the reflective-area pixel electrode 35 is 5 V, which is equal to that in the transmissive area 22, and the phase of the voltage of the reflective-area common electrode signal R-COM to be supplied to the reflective-area common electrode is opposite to the phase of the T-COM, and the amplitude is 7 V. Accordingly, an offset voltage is provided in the reflection, and the drive voltage in the reflective area 21 is set to (5 V+7 V)/2=6.0 V, and the dark-state setup voltage Vr(K) assumes 6 V.

Figure 14A:
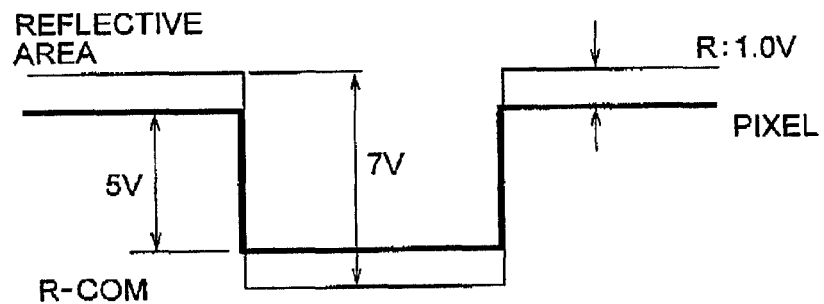
FIG. 14A and FIG. 14B are timing chart showing waveforms of driving the LCD device to assume a bright state in both the reflective area and transmissive area.
Figure 14B:
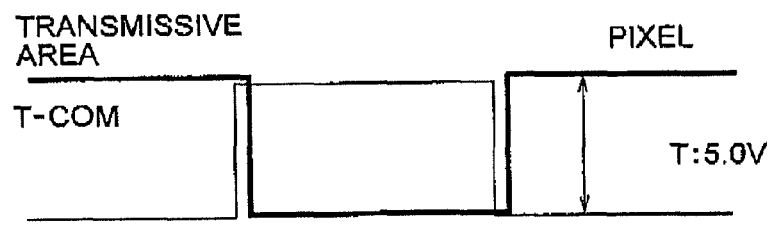

Next, display in white will be described. FIG. 14A and FIG. 14B show drive waveforms of display in white in the reflective area 21 and transmissive area 22, respectively. In the transmissive area 22, as shown in FIG. 14B, the phase of a pixel voltage (Pixel) to be supplied to the transmissive-area pixel electrode 36 and the phase of the voltage of the transmissive-area common electrode signal T-COM to be supplied to the transmissive-area common electrode 38 are opposite to each other, and the amplitude is 5 V, respectively. Accordingly, the drive voltage assumes 5 V, and bright-state setup voltage Vt(W)=5 V. On the other hand, in the reflective area 21, as shown in FIG. 14A, the amplitude of a pixel voltage (Pixel) to be supplied to the reflective-area pixel electrode 35 is 5 V, which is equal as in the transmissive area 22, and the phase of the voltage of the reflective-area common electrode signal R-COM to be supplied to the reflective-area common electrode match the phase of the T-COM, and the amplitude is 7 V. Accordingly, an offset voltage is provided in the reflection, and the drive voltage in the reflective area 21 is set to (7 V+5 V)/2=1.0 V, and the bright-state setup voltage Vr(W) assumes 6 V.

In the above-described operation, the dark-state setup voltage Vr(K) and bright-state setup voltage Vr(W) in the reflective area 21 are set to Vr(K)=6.0 V and Vr(W)=1.0 V, respectively, and the dark-state setup voltage Vt(K) and bright-state setup voltage Vt(W) in the transmissive area 22 can be set to Vt(K)=0 V and Vt(W)=5 V, respectively. Accordingly, it is possible to allow the inverted VR characteristics and the VT characteristics to match each other. This allows the image quality in the reflective area 21 and the image quality in the transmissive area 22 to match each other.

Next, a fourth example will be described. In the fourth example, by suitably setting up the rubbing angle of an orientation film for the LC layer, the inverted VR characteristics and the VT characteristics are allowed to match each other. Before describing the details of this example, in a transflective type LCD device which is driven by the inverting drive scheme, the investigation result of how the VT characteristics in the transmissive area 22 (FIG. 1) and the VR characteristics in the reflective area 21 are allowed to match each other will be described.

It is assumed here that the voltages applied to the reflective area 21 and transmissive area 22 are Vr and Vt, respectively, the black voltage and white voltage in the reflective area 21 are Vr(K) and Vr(W), respectively, the black voltage and white voltage in the transmissive area 22 are o Vt(K) and Vt(W), respectively, the reflectance is R, and the transmittance is T. It is also assumed that the slopes of the reflectance R in the vicinity of Vr(K), Vr(W) in the Vr–R characteristics (VR characteristics) are Sr(K), Sr(W) respectively. Similarly, slopes of the transmittance T in the vicinity of Vt(K), Vt(W) in the Vt–T characteristics (VT characteristics) are set to St(K), St(W). At this stage, [Vr(K)–Vr]–R characteristics and [Vt–Vt(K)]–T characteristics are considered.

FIG. 15 shows the VR characteristics and VT characteristics when the drive voltage is changed. With respect to these characteristics, when it is determined that Vt(K)=0 V, Vr(K)= 6 V, and [6–Vr]–R characteristics and [Vt–0]–T characteristics are plotted, a graph shown in FIG. 3 is obtained. Referring back to FIG. 3, it can be seen that, especially in the vicinity of black where the reflectance and transmittance is 0, and in the vicinity of white where the reflectance and transmittance is 1, with respect to the slopes of the reflectance characteristics Sr(K), Sr(W), the characteristics are dislocated by the slopes of the transmittance characteristics St(K), St(W).

That is, in the transmissive area, in the range from absence of applied voltage to a threshold voltage Vt-sh, since LC molecules scarcely move, the display is not changed to stay black, and the slope St(K) of the transmittance in the vicinity of the black voltage Vt(K) is moderate, approaching to display of white. That is, the slope St(W) of the transmittance at the end of the LC rotation where the orientation of LC molecules assumes approximately 45 degrees is steep. On the other hand, in the reflective area, in the range from absence of applied voltage to a threshold voltage Vr-sh, since LC molecules scarcely move, the display is not changed to stay white, and the slope Sr(W) of the reflectance in the vicinity of the white voltage Vr(W) is moderate, approaching to display of black. That is, the slope Sr(W) of the reflectance at the end of the LC motion where the orientation of LC molecules assumes approximately 45 degrees is steep.

From the above description, the slope Sr(K) of the reflectance and the slope St(K) of the transmittance upon display of black, and the slope Sr(W) of the reflectance and the slope St(W) of the transmittance upon display of white do not match each other, and the gradation is to be dislocated by that amount. Accordingly, it was found that allowing the slope Sr(K) of the reflectance and the slope St(K) of the transmittance upon display of black, and the slope Sr(W) of the reflectance and the slope St(W) of the transmittance upon display of white match each other will lead to the matching of both the characteristics.

Investigation was performed with respect to the change in orientation of LC when an electric field is applied to LC molecules. In general, with the case θ being an angle between the orientation direction of LC molecules and the direction of an electric field, the following torque:

$$\text{Torque} = (\epsilon E \times n) \times n = \epsilon_0 \epsilon_a E \sin(\theta)\cos(\theta)$$

will be applied to LC molecules, where EA is permittivity anisotropy. The direction of the electric field is perpendicular to the comb teeth electrodes, and, when the rubbing angle formed by the rubbing direction and the comb teeth electrodes is set to θ=90 degrees-α.

Calculating the above-described mathematical expression for the torque, the torque is maximum when θ=45 degrees. Accordingly, considering a case in which the orientation of LC molecules is rotated by an electric field by 45 degrees from the initial orientation, when the angle θ formed by the orientation direction of LC molecules in the reflective area and the direction of the electric field is set close to 45 degrees, the threshold voltage will be small. On the other hand, when the angle θ is set close to 90 degrees, conversely, the threshold voltage will be large. When the angle θ formed between the orientation direction of LC molecules and the direction of the electric field is close to 90 degrees, since the initial torque is small, the threshold voltage is high, and, increases when the orientation of LC molecules is rotated toward close to 45 degrees. However, when the angle θ formed between the orientation direction of LC molecules and the direction of the electric field is set close to 45 degrees, the torque decreases while the threshold voltage is lowered. Therefore, LC molecules become hard to rotate even if the electric field is applied, and the drive voltage will be increased.

Figure 16:
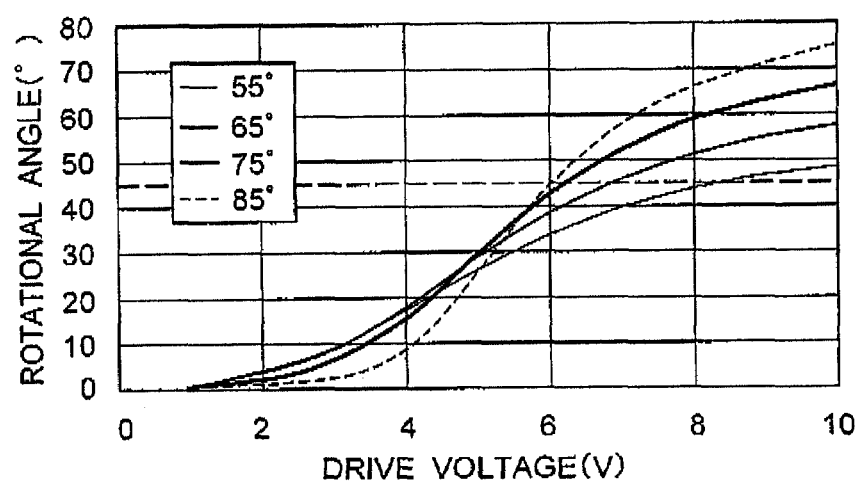
FIG. 16 is a graph indicative of the result of calculating the rotational direction of the director.

Actually, by paying notice to the manner of the orientation of LC molecules when an electric field is applied to the LC molecules, the rotation direction of a director upon presence of applied voltage is calculated with the angle θ formed between the orientation direction of LC molecules and the direction of the electric field being set from 55 degrees to 85 degrees at every 10 degrees. The result of the calculation is shown in FIG. 16. When the angle θ formed between the orientation direction of LC molecules and the direction of then electric field is at 90 degrees, since the rotation direction of LC molecules is not determined with respect to an electric field, the calculation is not performed. Furthermore, when the angle θ formed between the orientation direction of LC molecules and the direction of the electric field is 45 degrees or more, due to the need of rotation by 45 degrees from the initial orientation direction, the orientation is not performed for a direction perpendicular with respect to the comb teeth electrodes or more. Therefore, the calculation is not performed.

As shown in FIG. 16, when the angle θ formed between the orientation direction of LC molecules and the direction of the electric field is 85 degrees, the LC molecules scarcely rotate before the applied voltage assumes 2 V, and rotate gradually from 2 V, and steeply and largely rotate in the vicinity of 4 V and form an angle of 45 degrees with respect to the initial orientation at 6V. On the other hand, as the angle assumes 75 degrees, 65 degrees, 55 degrees, while LC molecules start to rotate under a smaller voltage, the torque becomes maximum when the angle θ formed between the orientation direction of LC molecules and the direction of an electric field is 45 degrees. In an area where the angle is larger, that is, in an area where the angle surpasses 30 degree, 20 degree, 10 degree, conversely, the change amount of rotation becomes small when the angle θ formed between the orientation direction of LC molecules and the direction of the electric field is small. Accordingly, it can be seen that from the rubbing angle, the voltage necessary when LC molecules are oriented to form 45 degrees by an electric field becomes large as 6.2 V, 7 V, and 9V.

From the above-described results, it is considered that, when setting the angle θ formed between the orientation direction of LC and the direction of an electric field to a smaller direction from 75 degrees, since the threshold voltage under which the LC molecules rotates becomes small, and the difference of the change amount between a case in which the manner of rotation of LC molecules changes from 45 degrees to 22.5 degrees direction and a case in which the manner changes from 0 degree to 22.5 degrees direction becomes small, the V–T characteristics and the V–R characteristics when the inverting drive scheme is performed match each other. Actually, an LC panel was formed such that the angle θ formed between the orientation direction of LC and the direction of an electric field assumed 85 degrees, 75 degrees, 65 degrees, and the change of the transmittance and the reflectance with respect to the voltage was evaluated.

Figure 17:
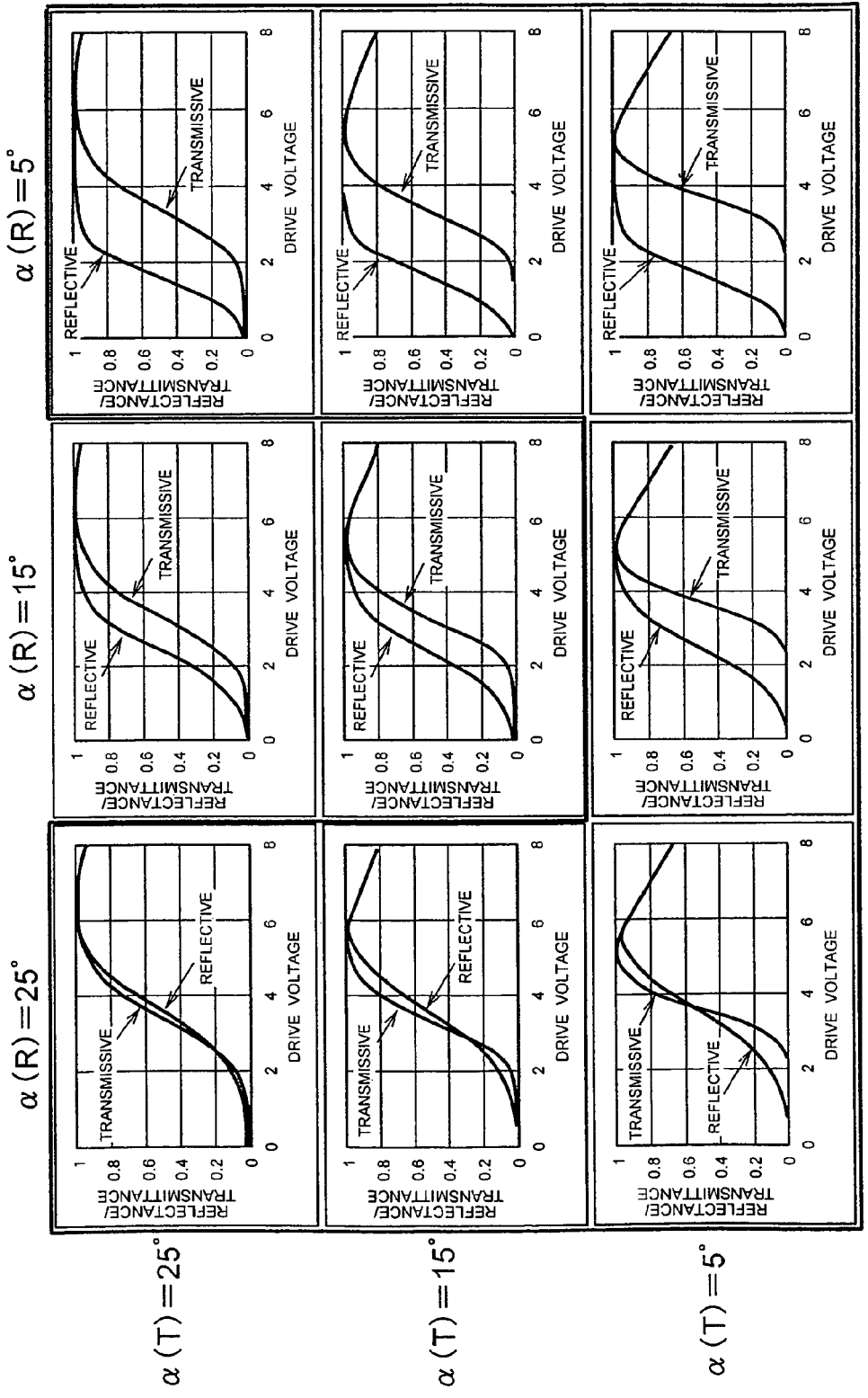
FIG. 17 is a graph indicative of the V–T curves and the V–R curves corresponding to respective combinations when the inverting driving technique is used by changing the orientation direction of LC molecules in the transmissive area and reflective area independently.

The V–T curve and the V–R curve are compared against each other while the inverting drive scheme is performed by changing the orientation direction of LC molecules in the transmissive area and reflective area independently of each other to 65 degrees, 75 degrees, 85 degrees, respectively. In FIG. 17, V–T curves and V–R curves corresponding to respective combinations are shown. With respect to combinations in which the orientation direction of LC molecules in the transmissive area is different from that in the reflective area, it can be realized by changing the electrode direction in the transmissive area and the electrode direction in the reflective area. Otherwise, it can be realized by, with the electrode direction being fixed, performing the rubbing using masking, or changing only the orientation direction by irradiating an ion beam.

In FIG. 17, with respect to any one of the transmissive area and reflective area, or both of them, in case of setting the orientation direction such that the rubbing angle is equal to 85 degrees or more, the V–T characteristics in the transmissive area and the V–R characteristics in the inverted reflective area (that is, [Vr(K)–V]–R characteristics) do not match each other, and the visibility is not desirable. On the other hand, in case the orientation direction in the transmissive area is set to 75 degrees, and the orientation direction in the reflective area is set to 65 degrees, the V–T curve in the transmissive area and the V–R curve in the inverted reflective area overlap each other, to provide a desirable visibility. Furthermore, in case the orientation direction is set to 65 degrees in both the transmissive area and reflective area, the V–T curve in the transmissive area and the V–R cure in the inverted reflective area can be made to match each other completely.

In case the width between the reflective-area common electrode and the reflective-area pixel electrode is Lr, and the width between the transmissive-area common electrode and the transmissive-area pixel electrode is Lt, since the cell gap in the transmissive area corresponds to λ/2, and the cell gap in the reflective area corresponds to λ/4. When it is determined that Lt=Lr, as shown in FIG. 2, the black voltage Vr(K) in the reflective area is large as compared with the white voltage Vr(W) in the transmissive area. Accordingly, so as to allow the drive voltages to match each other, it is necessary to set up Lr<Lt. In FIG. 3 and FIG. 17, the LCD device is formed such that Lr=4 µm and Lt=9 µm.

Under the above-described configuration, the transflective type LCD device was manufactured as the fourth example. The configuration of thus formed LCD device was similar to the configuration shown in FIG. 1. A LC material having a refractive index anisotropy of Δn=0.090 was used. With respect to the cell gap, the cell gap in the reflective area was 2 µm, and the cell gap in the transmissive area was 3 µm. The width between electrodes in the reflective area and transmissive area was Lr=4 µm and Lt=9 µm so as to set the drive voltages equal with each other.

Figure 18:
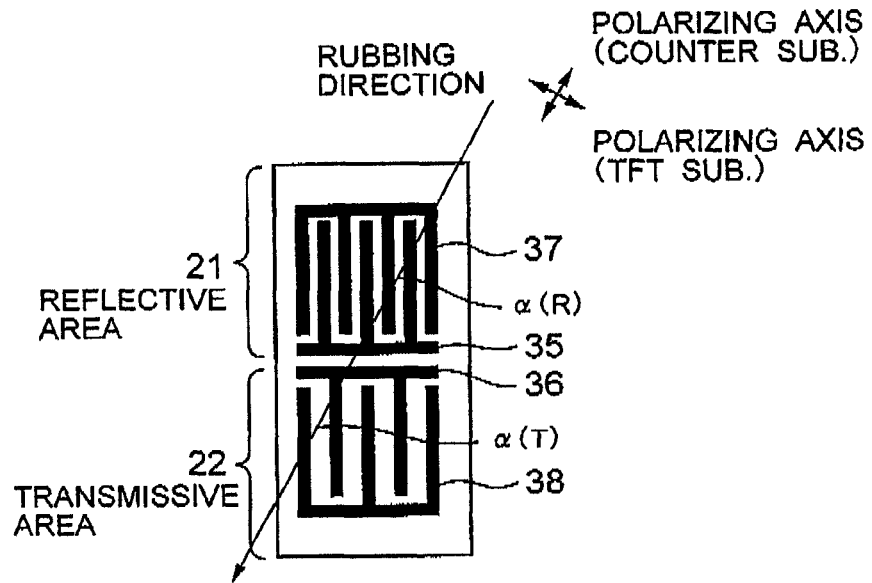
FIG. 18 is a top plan view indicative of the state of the electrode arrangement in a pixel of the LCD device in the fourth example.

FIG. 18 shows the configuration of the electrode arrangement in a pixel. The angle formed between the electrode direction of the comb teeth electrodes including the pixel electrode 35 and common electrode 37 in the reflective area 21 and the rubbing direction of the orientation film for the LC was set to α(R), and the angle formed between the electrode direction of the comb teeth electrodes including the pixel electrode 36 and common electrode 38 in the transmissive area 22 and the rubbing direction of the orientation film for the LC was set to α(T). Considering the angle formed between the rubbing angle and the comb teeth electrodes, α(R) and α(T) are set to α(R)=α(T)=25 degrees. Since the threshold voltage in the transmissive area and the threshold voltage in the reflective area can be made small by this configuration, the gradation luminance characteristics in both the areas matched each other.

The fifth example will be described. In the fourth example, gradation luminance characteristics match each other due to the setting of α(R)=α(T)=25 degrees. On the other hand, in the fourth example, when paying notice to the display in the transmissive area, the transmittance is minimum upon absence of applied voltage. However, even if an applied voltage is small, LC molecules will eventually rotate due to an electric field, and there may be an increased risk of leakage light. Accordingly, there is raised a problem that the black luminance increases due to the dispersion of the initial orientation of LC molecules and the dispersion of the applied voltage, which fact lowers the contrast ratio. In this example, substantially without lowering the gradation luminance characteristics in the transmissive area and reflective area, the lowering of contrast ratio in the transmissive area is suppressed.

In the fifth example, considering the angle formed between the rubbing angle of the orientation film and the comb teeth electrodes, which has been described in the fourth example, α(R) and α(T) are set to α(R)=25 degrees and α(T)=15 degrees. In this way, the gradation luminance characteristics match each other in the transmissive area and reflective area, and the lowering of contrast ratio in the transmissive area can be suppressed.

In the fifth example, considering the angle formed between the rubbing angle of the orientation film and the comb teeth electrodes, which has been described in the fourth example, α(R) and α(T) are set to α(R)=15 degrees and α(T)=25 degrees. In this way, the gradation luminance characteristics match each other in the transmissive area and reflective area, and the lowering of contrast ratio in the transmissive area can be suppressed.

Figure 19:
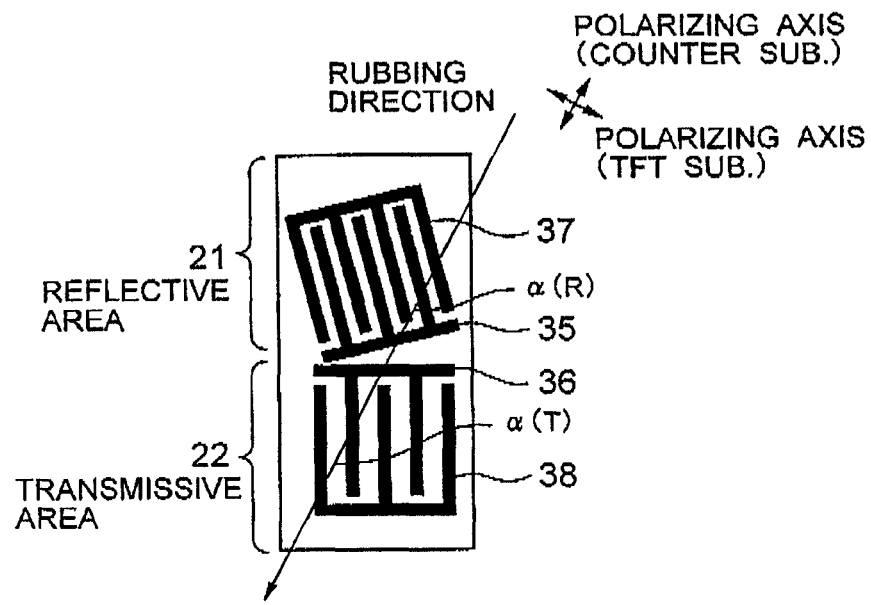
FIG. 19 is a top plan view indicative of the state of the electrode arrangement in a pixel of the LCD device in a fifth example.
Figure 20A:
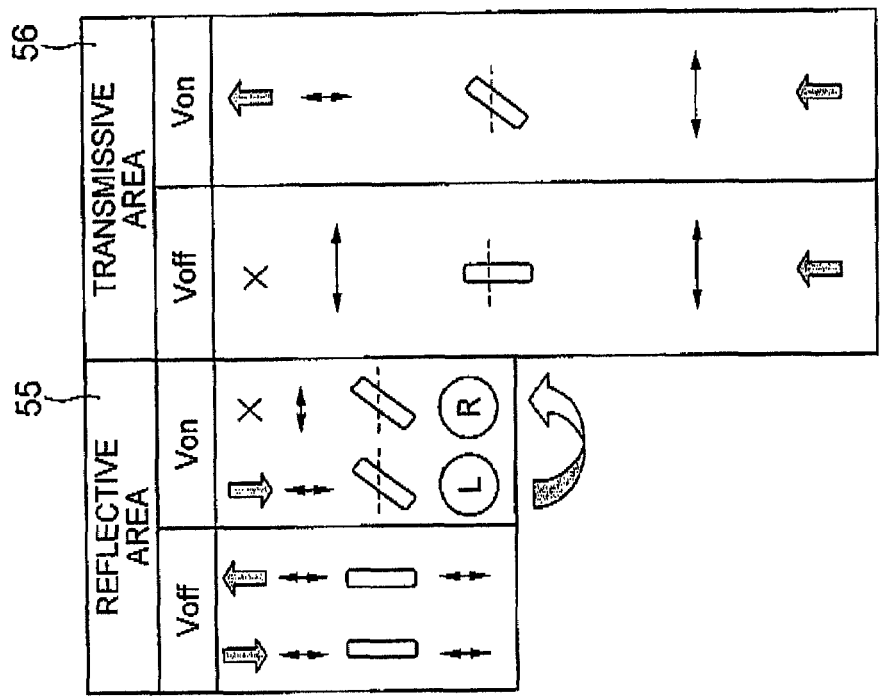
FIG. 20A is a sectional view indicative of the transflective type LCD device.
Figure 20B:
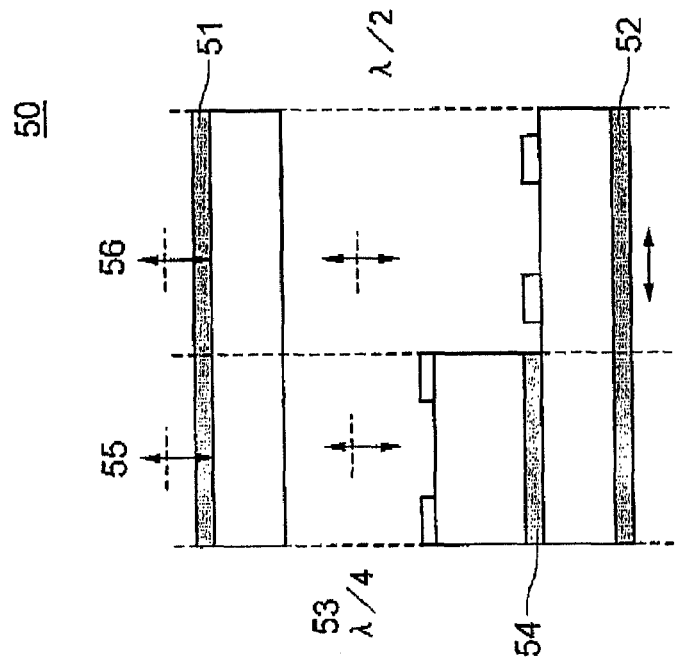
FIG. 20B is a schematic view indicative of the polarized state of light in the respective areas when the light is emitted from the polarizing film, LC layer, and polarizing film.
Figure 21:
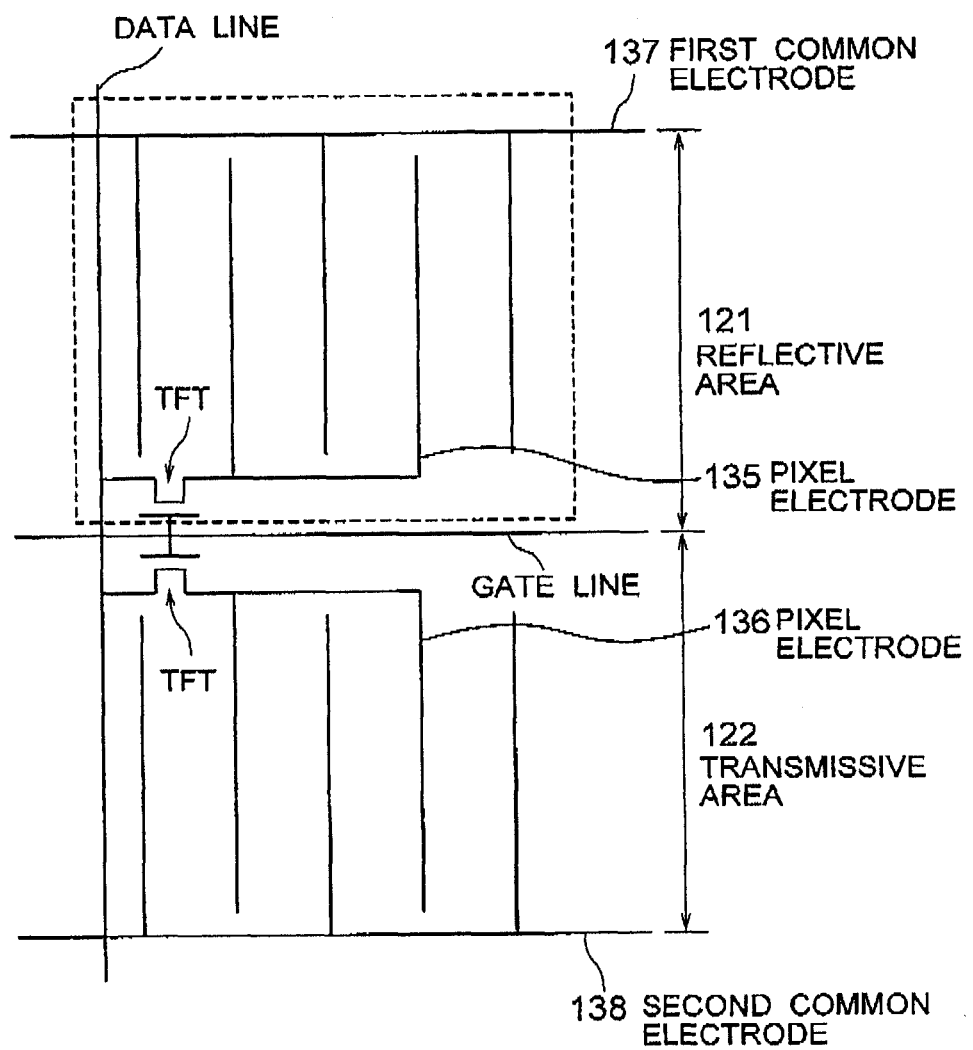
FIG. 21 is a block diagram indicative of the planar configuration in a single pixel of an LCD device described in JP-2006-180200A.

FIG. 19 shows the configuration of the electrode arrangement in a pixel in the fifth example. In this example, the electrode direction of the comb teeth electrodes including pixel electrode 35 and common electrode 37 in the reflective area 21 is different from the electrode direction of the comb teeth electrodes including pixel electrode 36 and common electrode 38 in the transmissive area 22, and the rubbing direction of the orientation film in the reflective area 21 is equal to the rubbing direction of the orientation film in the transmissive area 22. This allows the angle formed between the rubbing direction and the electrode direction of the comb teeth electrodes in the transmissive area different from that in the reflective area.

Instead of the above described configuration, there may be employed a configuration in which, as shown in FIG. 18, by allowing the electrode direction in the reflective area 21 equal to the electrode direction in the transmissive area 22, and allowing the rubbing direction in the reflective area 21 to be different from the rubbing direction in the transmissive area 22, the angle formed between the rubbing direction and the electrode direction of the comb teeth electrodes in the transmissive area is different from that in the reflective area. In this case, by masking only the transmissive area 22 and performing the rubbing processing for only the reflective area 21, and then masking only the reflective area 21 and performing the rubbing processing for only the transmissive area 22, different rubbing directions are realized in the reflective area 21 and transmissive area 22 of the orientation film. The orientation processing is not restricted to the rubbing processing, and there may be employed a configuration in which the orientation restraining force of LC molecules is achieved using light and ion beam.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A transflective liquid crystal display (LCD) device comprising an LCD panel including an array of pixels each having a reflective area and a transmissive area in a liquid crystal (LC) layer, and a drive circuit for driving said reflective area and said transmissive area of said LC layer by using an inverting drive scheme,
   wherein said reflective area is a normally white display which becomes a bright state when a drive voltage is a bright-state setup voltage and becomes a dark state when the drive voltage is a dark-state setup voltage larger than the bright-state setup voltage, and said transmissive area is a normally black display which becomes a dark state when the drive voltage is a dark-state setup voltage and becomes a bright state when the drive voltage is a bright-state setup voltage larger than the dark-state setup voltage,
   wherein characteristics of reflectance of said reflective area with respect to a value of [Vr(K)−Vr] and characteristics of transmittance of said transmissive area with respect to a value of [Vt−Vt(K)] substantially match each other, where Vr and Vt are drive voltages of said LC layer in said reflective area and transmissive area, respectively, Vr(K) is a dark-state setup voltage in said reflective area, and Vt(K) is a dark-state setup voltage in said transmissive area; and
   wherein:
   a first common electrode and a first pixel electrode in said reflective area are comb teeth electrodes and are disposed in such a manner that teeth of said first common electrode and teeth of said first pixel electrode are alternately aligned with a clearance Lr in an alignment direction, a second common electrode and a second pixel electrode in said transmissive area are comb teeth electrodes and are disposed in such a manner that teeth of said second common electrode and teeth of said second pixel electrode are alternately aligned with a clearance Lt in an alignment direction, and Lt is greater than Lr, wherein α(R) is 25° where α(R) is an angle formed between a direction in which said teeth of said first common electrode and said first pixel electrode in said reflective area extend and a rubbing direction for said LC, wherein α(T) ranges from 15° to 25° where α(T) is an angle formed between a direction in which said teeth of said second common electrode and said second pixel electrode in said transmissive area extend and said rubbing direction for said LC.

2. The transflective LCD device according to claim 1, wherein:

said drive circuit generates a first pixel signal corresponding to an input pixel signal, a second pixel signal obtained by performing a predetermined gradation conversion processing to said input pixel signal, and a common electrode signal common to said pixels;

said drive circuit drives one of said reflective area and said transmissive area based on said first pixel signal and said common electrode signal, and the other of said reflective area and said transmissive area based on said second pixel signal and said common electrode signal.

3. The transflective LCD device according to claim 2, wherein, said gradation conversion is such that:

said drive circuit drives one of said reflective area and said transmissive area by using a drive voltage V1 for display of bright state and a drive voltage V2 for display of dark state; and said drive circuit drives the other of said reflective area and said transmissive area by using a drive voltage V3 for display of bright state OR of dark state, where V3 is within a range between V1 and V2.

4. The transflective LCD device according to claim 1, wherein:

said drive circuit generates a first common electrode signal having a first amplitude and periodically inverted in the polarity thereof, a second common electrode signal having a second amplitude larger than said first amplitude and periodically inverted to have a phase opposite to a phase of said first common electrode signal, and a pixel signal common to said reflective area and said transmissive area;

said drive circuit drives one of said reflective area and said transmissive area based on said first common electrode signal and said pixel signal, and the other of said reflective area and said transmissive area based on said second common electrode signal and said pixel signal.

5. A transflective liquid crystal display (LCD) device comprising an LCD panel including an array of pixels each having a reflective area and a transmissive area in a liquid crystal (LC) layer, and a drive circuit for driving said reflective area and said transmissive area of said LC layer by using an inverting drive scheme, wherein said reflective area is a normally white display which becomes a bright state when a drive voltage is a bright-state setup voltage and becomes a dark state when the drive voltage is a dark-state setup voltage larger than the bright-state setup voltage, and said transmissive area is a normally black display which becomes a dark state when the drive voltage is a dark-state setup voltage and becomes a bright state when the drive voltage is a bright-state setup voltage larger than the dark-state setup voltage, wherein:

said drive circuit drives said reflective area and said transmissive area by using drive voltages Vr and Vt, respectively, said reflective area has a dark-state setup voltage Vr(K) and a bright-state setup voltage Vr(W), and said transmissive area has a dark-state setup voltage Vt(K) and a bright-state setup voltage Vt(W), and a first characteristic curve for reflectance of said reflective area with respect to a value of [Vr(K)−Vr] and a second characteristic curve for transmittance of said transmissive area with respect to a value of [Vt−Vt(K)] have therebetween a relationship such that:

a slope of said first characteristic curve in a vicinity of said Vr(K), a slope of said first characteristic curve in a vicinity of said Vr(W), a slope of said second characteristic curve in a vicinity of said Vt(K), and a slope of said second characteristic curve in a vicinity of said Vt(W) substantially match one another, wherein a first common electrode and a first pixel electrode in said reflective area are comb teeth electrodes and are disposed in such a manner that teeth of said first common electrode and teeth of said first pixel electrode are alternately aligned with a clearance Lr in an alignment direction, a second common electrode and a second pixel electrode in said transmissive area are comb teeth electrodes and are disposed in such a manner that teeth of said second common electrode and teeth of said second pixel electrode are alternately aligned with a clearance Lt in an alignment direction, and Lt is greater than Lr, wherein α(R) is 25° where α(R) is an angle formed between a direction in which said teeth of said first common electrode and said first pixel electrode in said reflective area extend and a rubbing direction for said LC, wherein α(T) ranges from 15° to 25° where α(T) is an angle formed between a direction in which said teeth of said second common electrode and said second pixel electrode in said transmissive area extend and said rubbing direction for said LC.

6. A transflective liquid crystal display (LCD) device comprising:

a reflective area and a transmissive area; and a drive circuit that generates a first common electrode signal periodically inverted in a polarity thereof at a predetermined amplitude, and that generates a second common electrode signal having a phase opposite to a phase of said first common electrode signal, wherein said drive circuit drives a liquid crystal (LC) of one of said reflective area and said transmissive area based on a common pixel signal that is common to said reflective area and said transmissive area, and based on said first common electrode signal, wherein said drive circuit drives an LC of the other of said reflective area and said transmissive area based on said common pixel signal and on said second common electrode signal, wherein a shape of a graph describing R characteristics with respect to [Vr(K)−Vr) and a shape of a graph describing T characteristics with respect to

[Vt−Vt(K)] match each other, where Vr and Vt are drive voltages of said LC in said reflective area and transmissive area, respectively, Vr(K) is a dark-state setup voltage in said reflective area, Vt(K) is a dark-state setup voltage in said transmissive area, R is a reflectance, and T is a transmittance, wherein a first common electrode and a first pixel electrode in said reflective area are comb teeth electrodes and are disposed in such a manner that teeth of said first common electrode and teeth of said first pixel electrode are alternately aligned with a clearance Lr in an alignment direction, a second common electrode and a second pixel electrode in said transmissive area are comb teeth electrodes and are disposed in such a manner that teeth of said second common electrode and teeth of said second pixel electrode are alternately aligned with a clearance Lt in an alignment direction, and Lt is greater than Lr, wherein $\alpha(R)$ is 25° where $\alpha(R)$ is an angle formed between a direction in which said teeth of said first common electrode and said first pixel electrode in said reflective area extend and a rubbing direction for said LC, wherein $\alpha(T)$ ranges from 15° to 25° where $\alpha(T)$ is an angle formed between a direction in which said teeth of said second common electrode and said second pixel electrode in said transmissive area extend and said rubbing direction for said LC.

7. The transflective LCD device according to claim 6, wherein an amplitude of said second common electrode signal is larger than that of said first common electrode signal.

8. A transflective liquid crystal display (LCD) device comprising:
a reflective area and a transmissive area; and
a drive circuit that generates a first common electrode signal periodically inverted in a polarity thereof at a predetermined amplitude, and that generates a second common electrode signal having a phase opposite to a phase of said first common electrode signal,
wherein said drive circuit drives a liquid crystal (LC) of one of said reflective area and said transmissive area based on a common pixel signal that is common to said reflective area and said transmissive area, and based on said first common electrode signal, wherein said drive circuit drives an LC of the other of said reflective area and said transmissive area based on said common pixel signal and on said second common electrode signal, wherein a slope of a reflectance in vicinity of Vr(K) in a graph describing R characteristics with respect to [Vr(K)−Vr] and a slope of a reflectance in vicinity of Vr(W) in the graph match each other, and a slope of a transmittance in vicinity of Vt(K) in a graph describing T characteristics with respect to [Vt−Vt(K)] and a slope of a transmittance in vicinity of Vt(W) in the graph match each other, where Vr and Vt are drive voltages of said LC in said reflective area and transmissive area, respectively, Vr(K) is a dark-state setup voltage in said reflective area, Vr(W) is a bright-state setup voltage in said reflective area, Vt(K) is a dark-state setup voltage in said transmissive area, Vt(W) is a bright-state setup voltage in said transmissive area, R is said reflectance, and T is said transmittance, wherein a first common electrode and a first pixel electrode in said reflective area are comb teeth electrodes and are disposed in such a manner that teeth of said first common electrode and teeth of said first pixel electrode are alternately aligned with a clearance Lr in an alignment direction, a second common electrode and a second pixel electrode in said transmissive area are comb teeth electrodes and are disposed in such a manner that teeth of said second common electrode and teeth of said second pixel electrode are alternately aligned with a clearance Lt in an alignment direction, and Lt is greater than Lr, wherein $\alpha(R)$ is 25° where $\alpha(R)$ is an angle formed between a direction in which said teeth of said first common electrode and said first pixel electrode in said reflective area extend and a rubbing direction for said LC, wherein $\alpha(T)$ ranges from 15° to 25° where $\alpha(T)$ is an angle formed between a direction in which said teeth of said second common electrode and said second pixel electrode in said transmissive area extend and said rubbing direction for said LC.

9. The transflective LCD device according to claim 8, wherein an amplitude of said second common electrode signal is larger than that of said first common electrode signal.

* * * * *